US007136073B2

(12) United States Patent
Newman

(10) Patent No.: US 7,136,073 B2
(45) Date of Patent: Nov. 14, 2006

(54) AUTOMATIC TONE MAPPING FOR IMAGES

(75) Inventor: Todd Newman, Palo Alto, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 790 days.

(21) Appl. No.: 10/271,579

(22) Filed: Oct. 17, 2002

(65) Prior Publication Data

US 2004/0075744 A1 Apr. 22, 2004

(51) Int. Cl.
*G09G 5/02* (2006.01)

(52) U.S. Cl. ............... 345/589; 345/590; 382/165; 382/166; 382/167

(58) Field of Classification Search ................. None
See application file for complete search history.

(56) References Cited

U.S. PATENT DOCUMENTS

| | | | | | |
|---|---|---|---|---|---|
| 3,912,927 | A | * | 10/1975 | Hoffman, II | 250/234 |
| 4,859,050 | A | | 8/1989 | Borah et al. | 351/210 |
| 5,633,511 | A | | 5/1997 | Lee et al. | 250/587 |
| 5,867,169 | A | | 2/1999 | Prater | 345/431 |
| 6,249,315 | B1 | * | 6/2001 | Holm | 348/251 |
| 6,275,605 | B1 | | 8/2001 | Gallagher et al. | 382/162 |
| 6,735,330 | B1 | * | 5/2004 | Van Metter et al. | 382/132 |
| 6,912,515 | B1 | * | 6/2005 | Jackson et al. | 706/19 |
| 2002/0126891 | A1 | * | 9/2002 | Osberger | 382/165 |
| 2003/0012414 | A1 | * | 1/2003 | Luo | 382/118 |
| 2003/0215153 | A1 | * | 11/2003 | Gindele et al. | 382/254 |

OTHER PUBLICATIONS

Title: Algorithms for Defining Visual Regions-of-Interest: Comparison with Eye Fixations, IEEE Transactions on Pattern Analysis and Machine Intelligence, vol. 22 No. 9, Sep. 2000, pp. 970-982 Author: Privitera et al.*
DiCarlo, J.M. and Wandell, B.A., "Rendering high dynamic range images," Stanford University, (selected pages).
Beretta, Giordano and Buckley, Robert, "Trends in color imaging on the Internet", AIC Color 2001.
The Negative, The Ansel Adams Photography Series / Book 2, Chapter 4, pp. 47-60, Little, Brown & Co., 1999.
"Experimental Evidence for Scannpath Eye Movements During Visual Imagery", S. Brandt, et al., IEEE Engineering in Medicine & Biology Society, 11th Annual International Conference, 1999.
"Top-Down Guided Eye Movements", D. Chernyak, et al., IEEE Transactions on Systems, Man and Cybernetics—Part B: Cybernetics, vol. 31, No. 4, Aug. 2001, pp. 514-522.
"Why Virtual Reality Works! Top-Down Vision in Humans and Robotics", L. Stark, 1994 (Paper presented at the 4th International Conference on Artificial Reality and Telexistence (ICAT).
"Top-Down Vision in Humans and Robots", L. Stark, Sep. 1993, Proc. SPIE vol. 1913, p. 613-621.
"Keynote Lecture: Search Patterns and Search Paths in Human Visual Search", L. Stark, et al., Chapter 2, *Visual Search 2*, Taylor & Francis: Philadelphia, PA, US, 1993. p. 37-58.

* cited by examiner

*Primary Examiner*—Mark Zimmerman
*Assistant Examiner*—Jwalant Amin
(74) *Attorney, Agent, or Firm*—Fitzpatrick, Cella, Harper & Scinto

(57) ABSTRACT

An image processing method for processing image data comprises the steps of obtaining scanpath data corresponding to original image data, determining regions of interest for the original image data based on the obtained scanpath data, and mapping tone values of the original image data corresponding to each region of interest in order to obtain tone-mapped image data.

27 Claims, 9 Drawing Sheets

AUTOMATIC TONE MAPPING FOR IMAGES

BACKGROUND OF THE INVENTION

1. Field of the Invention

The present invention relates to the field of image processing and in particular to tone-mapping of luminance levels of an original image to adjusted luminance levels for improved appearance of the image on an output medium.

2. Description of the Related Art

In the field of image processing and in the art of photography, tonal range, also known as luminance range or brightness range, is the difference between the maximum (highlights) and minimum (shadows) amounts of light reflected from a subject. With respect to color images, tonal range refers to the lightness of the colors, without regard to their hue or colorfulness. Although due to the Helmholtz-Kohlrausch effect, colors of higher chroma appear lighter than measurements would indicate. The differences in tonal value create contrast. Contrast, in turn, defines shapes and helps objects to be seen more clearly in a viewed image.

In the art of photography, techniques have been developed in attempts to appropriately map luminance levels of the original captured scene to luminance levels for display of the image on an output medium. One technique is the use of a global illumination algorithm, which computes luminance values for an image, which closely match the radiance values of the corresponding real world scene. The resulting image from such an algorithm is usually displayed on an output medium such as a CRT or photographic paper. This step requires a conversion from luminance values of the captured image to corresponding luminance values that are within a range that can be displayed by the output medium.

The above technique is complicated by the fact that the range of luminance values that can be displayed by a typical output medium is much smaller than the range that exists in the real world. Whereas scene luminance levels can easily vary by a factor of 10,000, luminance levels for CRT displays only vary by a factor of 100, and print luminance levels only vary by a factor of about 20. In addition, it is not necessarily desirable to accurately match the original scene luminance levels to a corresponding level for display on the output medium. As various studies have shown, indoor viewers, for example, usually prefer images that have a higher contrast level compared to that of the original scene. Furthermore, viewers often prefer that certain objects of interest within the image appear within a certain tone range to achieve an optimized tone appearance. For example, in an image of a person sitting in an office, the person's face would likely be of more interest to a typical viewer than other objects appearing within the image.

One technique, known as the "zone system", was developed for use by photographers in taking and developing photographic images. The zone system starts with obtaining measurements of the tone response curves of photographic paper on which the image is to be displayed. According to the zone system, the tonal range of a photographic print is divided into zones 0 to X. Zone 0 is full black; zone X is full white. Although some shadings of a viewed image can be distinguished in zones I and IX, any part of the image in which texture detail is to be distinguished should generally fall between zones II and VIII.

Under the zone system, the effects of exposure and development times are quantified in order for the photographer to understand the effects of these parameters on the ultimate tonal reproduction of objects within the output image. Aperture and exposure time are then set by the photographer based on these parameters. In this manner, the above method works backwards from the envisioned placement of tonal values on the final image on the output medium. For example, the photographer must consider, at the time of capturing the image, the development of the photographic print on the output medium, the development of the negative, and the parameters for capturing the original image by the camera. A major disadvantage of the zone system is its requirement for performance of complex calculations by the photographer at the time of taking the picture. Clearly, the application of the zone system is manual and requires expertise well beyond the skills of an amateur.

Another approach, proposed by Jack Holm and described in U.S. Pat. No. 6,249,315, concerns an attempt to apply the zone system to digital photography. In general, the Holm approach maps tonal values within each of the various tonal zones to new tonal values based on characteristics of an entire image. This approach includes construction of an image dependent non-linearity model by constructing a scaled image based on the original image and then deriving image statistics from the scaled image. Image statistics from the scaled image are derived by using preliminary information about the capture device which captured the original image in order to produce scaled image focal plane data, determining significant statistical values of the scaled image focal plane data, and determining flare characteristics of the original image based on viewing environment of the original image.

The Holm approach suffers from the same complexity disadvantage suffered by the zone system, namely, that of requiring extensive knowledge about the camera and the output medium. Furthermore, the Holm approach requires extensive knowledge about the conditions under which the image was captured, in order to calculate the flare values. Another drawback of the Holm approach is that it achieves tonal mapping based on tonal statistics of the entire image without consideration of individual areas within the image that a typical viewer would likely find most interesting. This is because the algorithm developed by Holm has no way of inferring which parts of the captured image are more interesting and which parts are less interesting to a viewer. Therefore, the Holm approach assumes predetermined tone-mapping from the original image to new tonal zones, regardless of which objects in the image are of interest to the viewer.

The current generation of digital cameras typically use a same tonal mapping for all images captured, regardless of the types of objects contained within the image that may be of interest to a viewer. Accordingly, resulting printed images obtained from such cameras are not optimal in providing aesthetic pleasure to the viewer because the tone-mapping has not been adjusted based on objects of interest in the image.

SUMMARY OF THE INVENTION

It is an object of the present invention to address the foregoing disadvantages by developing a method for automatic determination of regions within an image that would be of interest to a viewer, and to use those regions of interest in determination of tonal mapping parameters for the image.

One aspect the invention is directed to processing image data in which scanpath data corresponding to original image data are obtained and regions of interest for the original image data are determined based on the obtained scanpath data. Tone values of the original image data corresponding to each region of interest are then mapped in order to obtain tone-mapped image data.

Preferably, the scanpath data is obtained from a filtered image. Preferably, a meta algorithm is used to analyze a plurality of scanpath algorithms. Preferably, the meta algorithm selects two or more algorithms based on the filtered image data from which a weighted average of scanpath data is generated. Preferably, a plurality of regions of interest are obtained based on the obtained scanpath data.

By virtue of this arrangement, luminance values of a captured scene are mapped for optimal appearance on an output medium, based on what objects a viewer would find interesting in an image. This results in creation of an output image that is more pleasing to a viewer because tone values for regions within an image that contain objects a viewer would find most interesting are set to optimal levels for definition and contrast with respect to the remainder of the image. The invention, therefore, automatically maps tone levels for optimal viewing of interesting objects within the image, without requiring the user to know and use a complex method such as the zone system.

According to another aspect, the invention is directed to processing image data in which original image data corresponding to an image are filtered in order to obtain filtered image data, and scanpath data corresponding to the filtered image data are obtained by using a meta algorithm which analyzes a plurality of scanpath algorithms. The meta algorithm selects at least two of the scanpath algorithms based on the filtered image data and generates a weighted average of the scanpath data obtained from the selected scanpath algorithms. A plurality of regions of interest for the original image data are determined based on the obtained scanpath data, and a set of tone-mapping parameters are determined for each of the determined regions of interest. A tone-mapping algorithm is then utilized to map tone values of the original image data for each region of interest based on the corresponding set of tone-mapping parameters in order to obtain tone-mapped image data.

Preferably, in one embodiment, tentative-lightness image data is derived from the original image data and the scanpath data is obtained from the tentative-lightness image data. A set of tone-mapping parameters are determined for each region of interest and the tone values are mapped based on the tone-mapping parameters by using a tone-mapping algorithm. Preferably, in a second embodiment, the scanpath data is a weighted average based on the time spent by a viewer at a location of the original image corresponding to the original image data, as measured by eye-tracking means.

By virtue of this arrangement, luminance values of a captured scene are mapped for optimal appearance on an output medium, based on what objects a viewer would find interesting in an image. This results in creation of an output image that is more pleasing to a viewer because tone values for regions within an image that contain objects a viewer would find most interesting are set to optimal levels for definition and contrast with respect to the remainder of the image. The invention, therefore, automatically maps tone levels for optimal viewing of interesting objects within the image, without requiring the user to know and use a complex method such as the zone system.

This brief summary has been provided so that the nature of the invention may be understood quickly. A more complete understanding of the invention can be obtained by reference to the following detailed description of a preferred embodiment thereof in connection with the attached drawings.

DETAILED DESCRIPTION OF PREFERRED EMBODIMENTS

Figure 1:
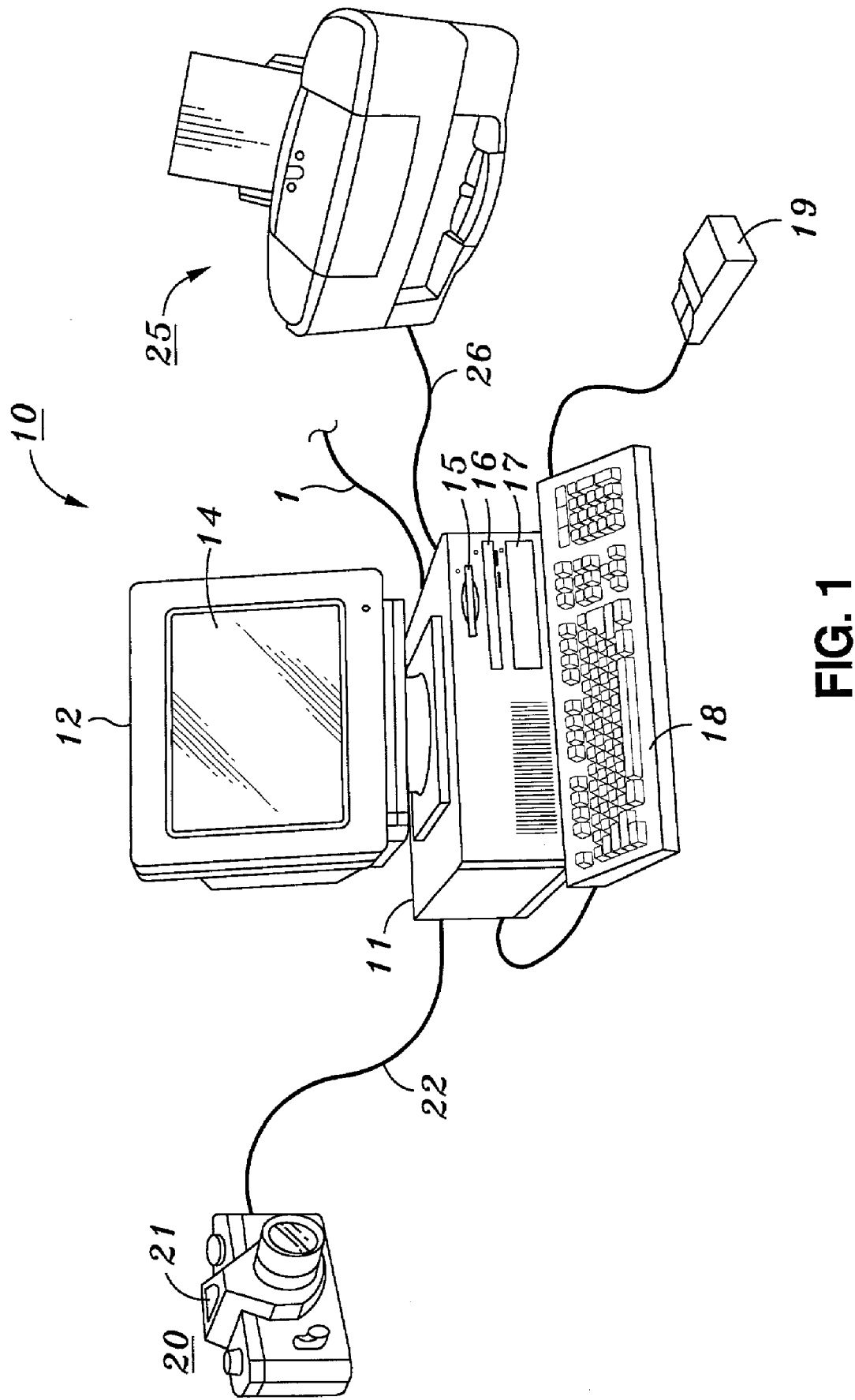
FIG. 1 is a view illustrating the outward appearance of a representative embodiment of the invention.

FIG. 1 is a view showing the outward appearance of a representative embodiment of the invention. As seen in FIG. 1, a computing environment is shown which includes computing equipment 10, image capture device 20 and printer 25. Computing equipment 10 includes host processor 11, color monitor 12, display screen 14, keyboard 18, pointing device 19, fixed disk 17, floppy disk drive 15, CD-ROM drive 16. Each of these elements will now be described in more detail.

Host processor 11 comprises a typical computer workstation that is capable of displaying images. Host processor 11 preferably executes a windowing operating system such as Microsoft Windows, Linux with the X window system or MacIntosh operating systems. Provided with computing equipment 10 are color monitor 12 including display screen 14, keyboard 18 for entering text data and user commands, and pointing device 19. Pointing device 19 preferably comprises a mouse, for pointing, selecting and manipulating objects displayed on display screen 14.

Fixed disk 17 and floppy disk drive 15 and CD-ROM drive 16 allow computing equipment 10 to access information such as image data, computer executable process steps, application programs, and the like, stored on removable and non-removable memory media. In addition, network access 1 is provided which allows computing equipment 10 to acquire information, such as images and application programs through the Internet or the World Wide Web. Network 1 may also be a local area network (LAN), or virtually any other type of network, including a wide area network (WAN), an intranet, for example. Network 1 generally comprises infrastructure for forming a computer network and may include various communication devices such as routers and data communication hubs (not shown) that provide a communication link between the various components connected to the network. In addition, communication between various elements of a network may be conducted through wireless means.

Image capture device 20 is preferably a typical digital camera for capturing an image of a scene, but can be any other device for capturing an image, such as video camera, for example. Preferably, image capture device 20 captures such an image and transmits the captured image data to computing equipment 10 via connection 22. However, the image transmitted to computing equipment 10 can also be retrieved from memory such as fixed disk drive 15, CD-ROM drive 17, through the network 1, or by way of wireless communication.

Printer 25 is a typical printing device, such as an ink jet printer or a color laser beam printer, for example, and is preferably capable of printing color images. Printer is connected to computing equipment 10 via connection 26 or through a wireless means. In this manner, print jobs, including images, can be sent from computing equipment 10 to printer 25 for processing and printing.

In general, the present invention may be implemented within a computing device such as computing equipment 10 or within a camera or other image device such as image capture device 20. In other words, automatic tone mapping based on "regions of interest" can be performed directly in image capture device 20 before the image is transferred to an external device, or it can be performed in computing equipment 10 after obtaining an image from image capture device 20.

Figure 2:
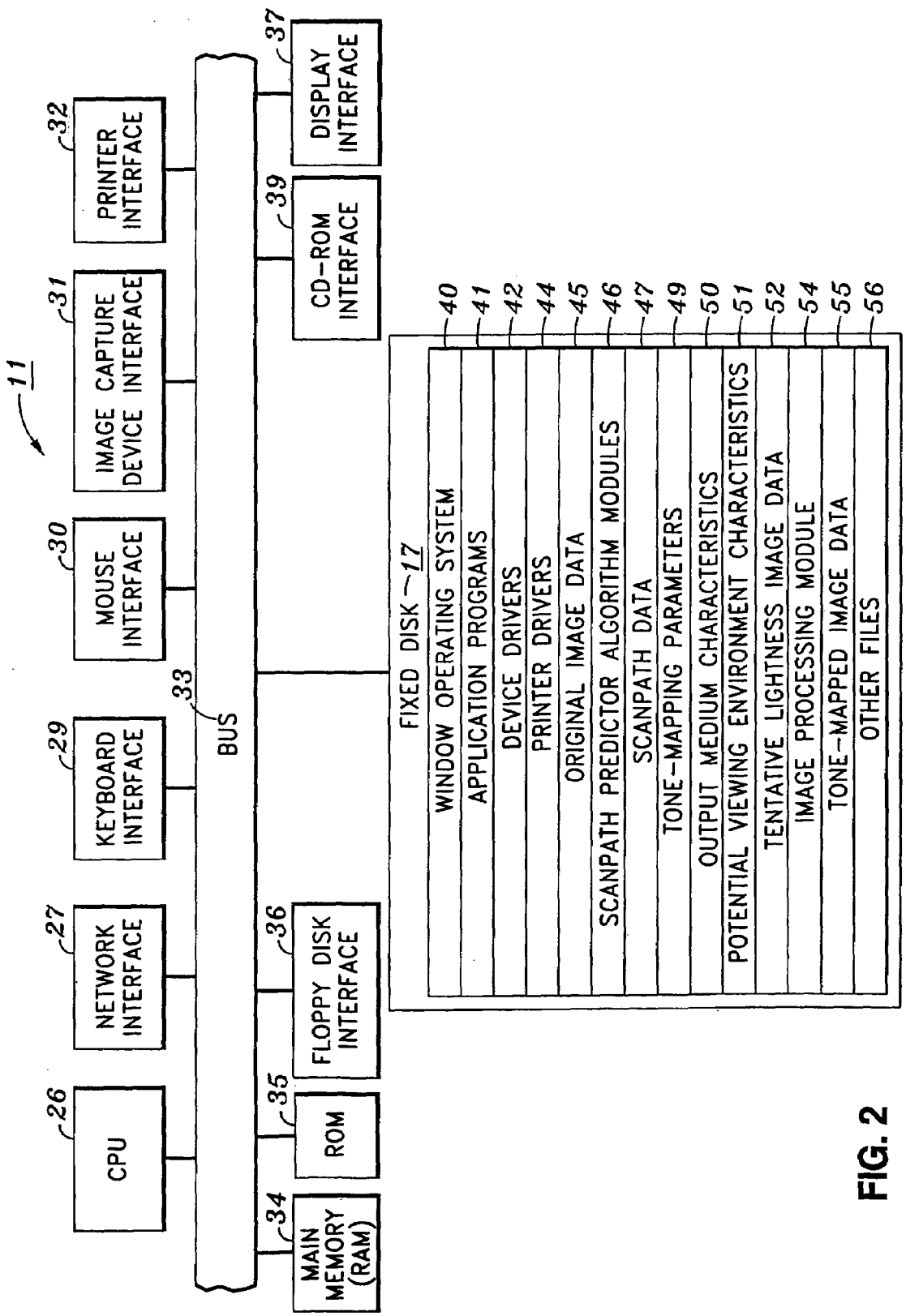
FIG. 2 is a detailed block diagram showing the internal architecture of the computing equipment shown in FIG. 1.

FIG. 2 is a detailed block diagram showing the internal architecture of host processor 11. As seen in FIG. 2, host processor 11 includes central processing unit (CPU) 26, network interface 27, keyboard interface 29, mouse interface 30, image capture device interface 31, printer interface 32, main memory (RAM) 34, read only memory (ROM) 35, floppy disk interface 36, bus 33, CD-ROM interface 39, display interface 37, and fixed disk 17. Each of these elements will now be described in more detail.

CPU 26 is a programmable microprocessor, which is interfaced to bus 33. Also coupled to bus 33 are fixed disk 17, network interface 27 for interfacing with network 1, random access memory ("RAM") 34 for use as main memory, read only memory ("ROM") 35, keyboard interface 29 for interfacing with keyboard 18, mouse interface 30 for interfacing to mouse (pointing device) 19, floppy disk interface 36 for interfacing to a floppy disk drive 15, display interface 37 for interfacing to monitor (display) 12, CD-ROM interface 39 for interfacing to CD-ROM drive 17, image capture device interface 31 for interfacing with image capture device 20, and printer interface 32 for interfacing to printer 25.

Random access memory (RAM) 34 interfaces to bus 33 to provide CPU 26 with access to memory storage, thereby acting as the main run-time memory for CPU 26. In particular, when executing stored program instruction sequences, CPU 26 loads those instruction sequences from memory media such as fixed disk 17 into RAM 34 and executes those stored program instruction sequences out of RAM 34. It should also be noted that standard-disk swapping techniques available under windowing operating systems allow segments of memory to be swapped to and from RAM 34 and fixed disk 17. Read-only memory (ROM) 35 stores invariant instruction sequences, such as start-up instruction sequences for CPU 26, or basic input/output operation system (BIOS) sequences for the operation of peripheral devices attached to host processor 11.

Fixed disk 17 is one example of a computer-readable medium that stores program instruction sequences executable by CPU 26 so as to constitute window operating system 40, printer drivers 44, device drivers 42 and application programs 41, which may include programs such as internet browser application programs such as Microsoft Internet Explorer or Netscape Navigator.

Other information stored on fixed disk 17 will now be briefly described. Original image data 45 refers to the raw image captured by image capture device 20. Scanpath predictor algorithm modules 46 refers to algorithms that are used for predicting a scanpath corresponding to the original image data 45 and for obtaining regions of interest of the original image. Scanpath data 47 refers to data that is obtained by execution of scanpath predictor algorithm modules 46. Tone-mapping parameters 49 are used for tone mapping the original image data 45 to obtain tone-mapped image data 55. Output medium characteristics 50 describes the tonal range of the medium on which the tone-mapped image is to be displayed. Potential viewing environment characteristics 51 refer to the likely lighting conditions under which the tone-mapped image is likely to be viewed. Tentative lightness image data 52 corresponds to a conversion process performed on the original image data 45 in order to bring the original image within the range of human perception. Image processing module 54 refers to the module which implements the present invention. Image processing module 54 may be a dynamic link library ("DLL"), a plug-in to other application programs such as image manipulation programs like Adobe Photoshop, or a stand alone software application program. Other files 56, refers to any pertinent information, other than those mentioned above, that may be stored on fixed disk 17.

Figure 3:
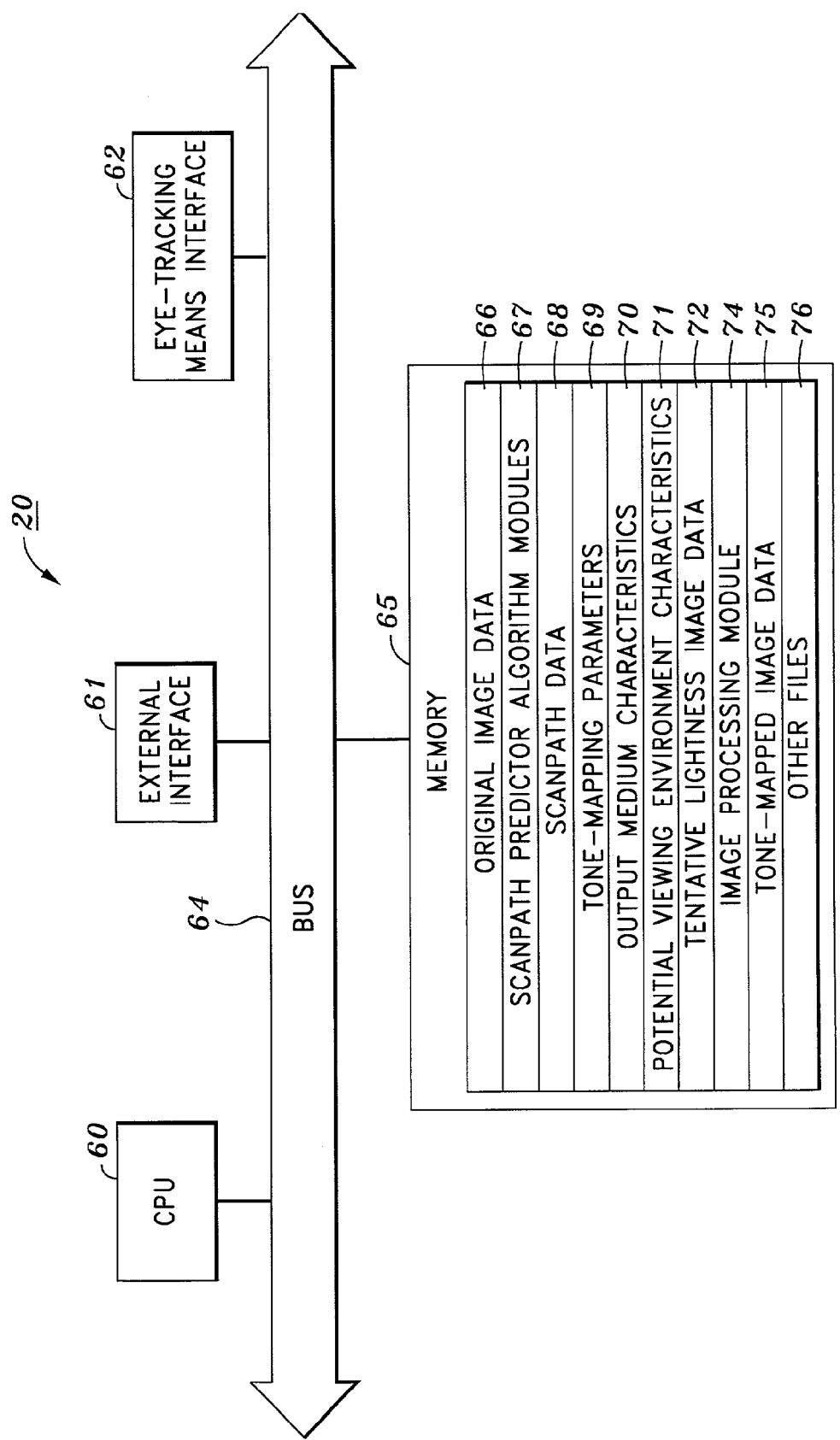
FIG. 3 is a detailed block diagram showing the internal architecture of the image capture device shown in FIG. 1.

FIG. 3 is a detailed block diagram of image capture device 20. Image capture device 20 includes central processing unit (CPU) 60, external interface 61, eye-tracking means interface 62, bus 64, and memory 65. Each of these elements will now be described in more detail.

CPU 60 is preferably a programmable microprocessor, which is interfaced to bus 64. Also coupled to bus 64 is external interface 61 for capturing and transmitting image data captured by image capture device 20 to an external device such as computing equipment 10, via connection 22. It can be appreciated that connection 22 can be USB, serial bus, Firewire, or some other connection. In addition, image data captured by image capture device 20 may be transmitted to an external device such as computing equipment 10 via wireless communication. Eye-tracking means interface 62 is also connected (optionally) to bus 64 for obtaining eye-tracking data from an eye-tracking means provided on image capture device 20, according to one embodiment of the invention.

Memory 65 is used to store data and instruction sequences, such as start-up instruction sequences for CPU 60. Memory 65 can be read only memory (ROM), or Programmable Read-Only Memory (PROM) such as an Electrically Alterable Programmable Read-Only Memory (EAPROM), Electrically Erasable Programmable Read-Only Memory (EEPROM), or Flash Erasable Programmable Read-Only Memory ("Flash ROM"), for example. Memory 65 interfaces with bus 64 so as to provide storage to CPU 26 during execution of software programs such as scanpath predictor algorithm modules. More specifically, CPU 60 executes computer-executable process steps from memory 65 in order to execute software programs. Data such as original image data 66 can be accessed by CPU 60 from memory 65 during execution of a software program.

Scanpath prediction is implemented in image capture device 20 through scanpath predictor algorithm module 67, in order to obtain scanpath data 68. Original image data 66, scanpath predictor algorithm modules 67, scanpath data 68, tone-mapping parameters, output medium characteristics, potential viewing environment characteristics, tentative lightness image data, image processing module, tone-mapped image data and other files stored in memory 65 are similar to those described with reference to fixed disk 17 of FIG. 2, and will not be further described here.

Figure 4:
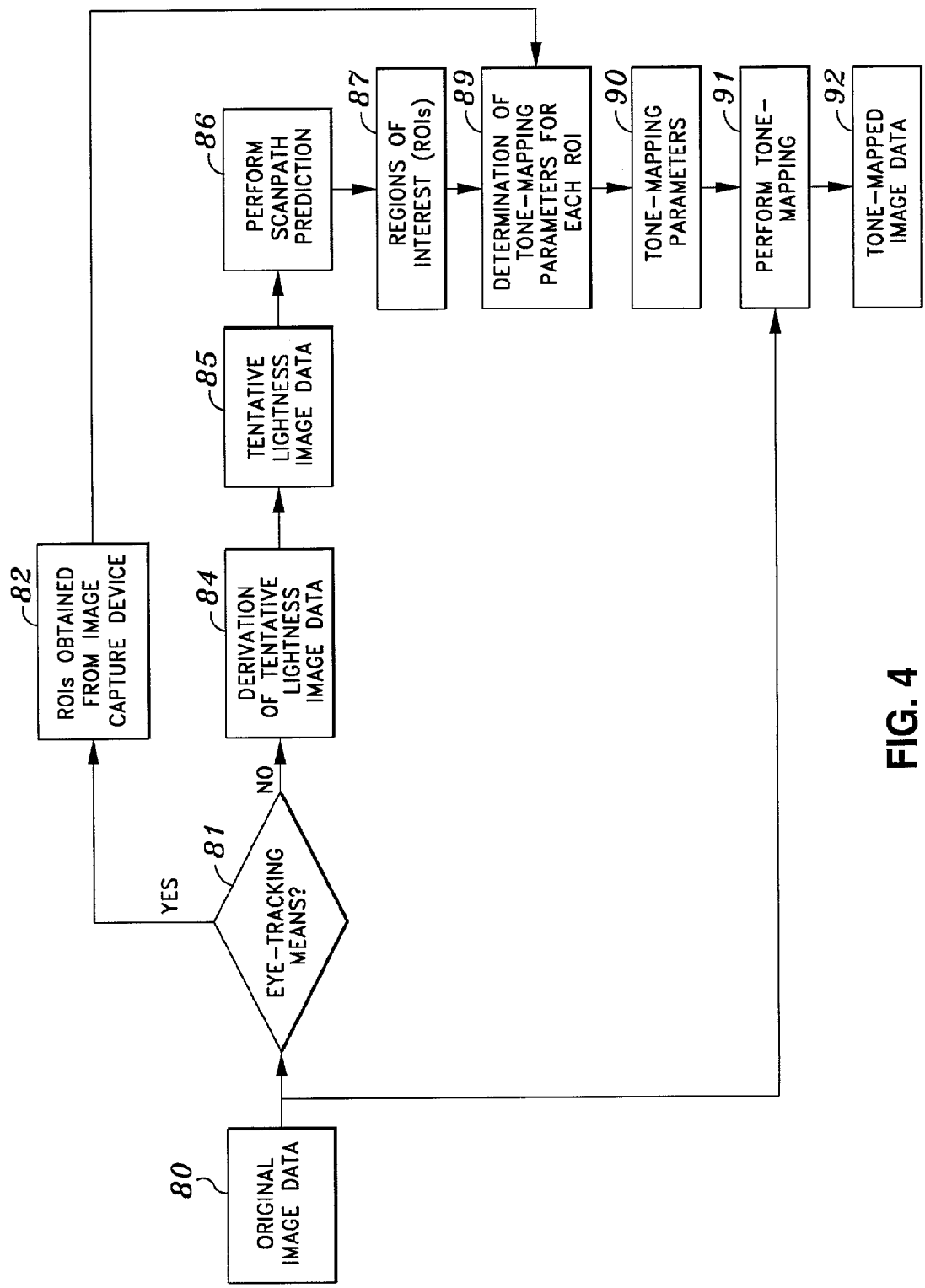
FIG. 4 is a block diagram for explaining one embodiment of the invention.

FIG. 4 is a block diagram for explaining the automatic tone-mapping of image data according to one embodiment of the invention. Original image data 80 preferably corresponds to 10–12 bit RGB image. Digitized color images are represented as an array of pixels, where each pixel contains numerical components that define a color. Three components, or primary colors, are necessary and sufficient for this purpose in various color spaces. In RGB color space, these primary colors are Red, Green and Blue. It can be appreciated that original image data 80 can also be represented in other color spaces such as XYZ color space, whose spectral composition corresponds to the color matching characteristics of human vision, and by other bit values such as 8 or 16, for example.

According to one embodiment of the invention, the process described in FIG. 4 is performed by image processing module 54 in fixed disk 17 of computing equipment 10. More particularly, CPU 26 loads image processing module 54 from fixed disk 17 into RAM 34 and then executes those stored program instruction sequences out of RAM 34 to carry out automatic tone-mapping of image data.

The process described in FIG. 4 can also be implemented directly within image capture device 20 by image processing module 74 of memory 65. More specifically, CPU 60 of image capture device 20 executes the process steps of image processing module 74 out of memory 65 to carry out automatic tone-mapping of image data.

In general, the present invention determines tone-mapping parameters for each region of interest in original image data 80 so that original image data 80 can be tone-mapped to desirable tonal values for optimal appearance to a viewer. The regions of interest can be obtained from scanpath predictor algorithms. In the alternative, presence of eye-tracking means 81 in image capture device 20 can obviate the need to predict the scanpath and the regions of interest 82 corresponding to the image. This is because by using appropriate eye-tracking hardware, it is possible to track a viewer's eye fixations and measure the scanpath of the viewer, such as a photographer using image capture device 20, while viewing an image. This provides actual regions of interest corresponding to portions of the image that the photographer found to be interesting or important.

If eye-tracking means 81 is not used, a tentative lightness image data 85 is derived at block 84. Creation of tentative lightness image data 85 from the original image data 80 is done prior to performing scanpath prediction and is necessitated by the fact that human vision has a nonlinear perceptual response to brightness. By way of an example, a source having a luminance that is only 18% of a reference luminance appears about half as bright. The perceptual response to luminance, i.e., lightness, can help determine whether an image is within a range of human perception. The tentative lightness image data 85 can be, for example, the default NTSC weighting of original image data 80, resulting in NTSC Y format data that more accurately matches human perception.

Scanpath prediction 86 is performed on tentative lightness image data 85 by use of scanpath predictor algorithms, which operate on tentative lightness image data 85 and predict which regions of the image data are likely to be of interest to a viewer. Scanpath predictor algorithms refer to software developed for the purpose of predicting eye fixations for a typical viewer of an image. It has been determined that the human eye can only focus sharply on a field of vision of about 1 degree. When looking at an object, the human eye is fixated on something for a short period of time, followed by fixation on anther part of the object, and so on until viewing is completed. The human brain then combines all the images formed by the different fixations into a single image. It has been demonstrated that the eye does not move about in a regular pattern such as left to right, top to bottom. Instead the fixations are dictated by the contents of the scene according to what a viewer finds interesting or important in the scene. Scanpath of an image refers to the sequence of fixations thus described.

In the absence of eye-tracking means 81 for measuring eye fixations of a viewer of an image, it is possible to model the behavior of a viewer, such as the photographer who is taking a photograph of the image, and approximate the scanpath of the image. This modeling can be based on models of human behavior such as assumptions about the interest values of edges and contrast, for example, or on experimental data obtained from a sampling of subjects, assuming that their behavior predicts what a typical viewer of the image would find interesting.

In one embodiment of the present invention, scanpath prediction is performed by scanpath predictor algorithm modules 46 which are used to predict a scanpath for a set of image data corresponding to a particular image. As discussed in more detail below, various algorithms have been developed for predicting a human scanpath of a given image based on image characteristics such as edges, luminance shifts and contrast shifts, for example. Therefore, each of the multiple scanpath predictor algorithm modules 46 corresponds to a unique scanpath model (algorithm) for predicting the scanpath of a given image. In the present invention, one or more of scanpath predictor algorithm modules 46 is used singularly or in combination to predict the human scanpath of a given image.

Returning to FIG. 4, "regions of interest" ("ROIs") 87 are then obtained from scanpath prediction 86. Then a determination of tone-mapping parameters for each region of interest 89 is made to result in tone-mapping parameters 90, which are applied 91 in tone-mapping of original image data 80, resulting in tone-mapped image data 92. If eye-tracking means is used, actual ROIs are obtained from image capture device 20 instead of being predicted, and are used to determine tone-mapping parameters at block 89.

Figure 5:
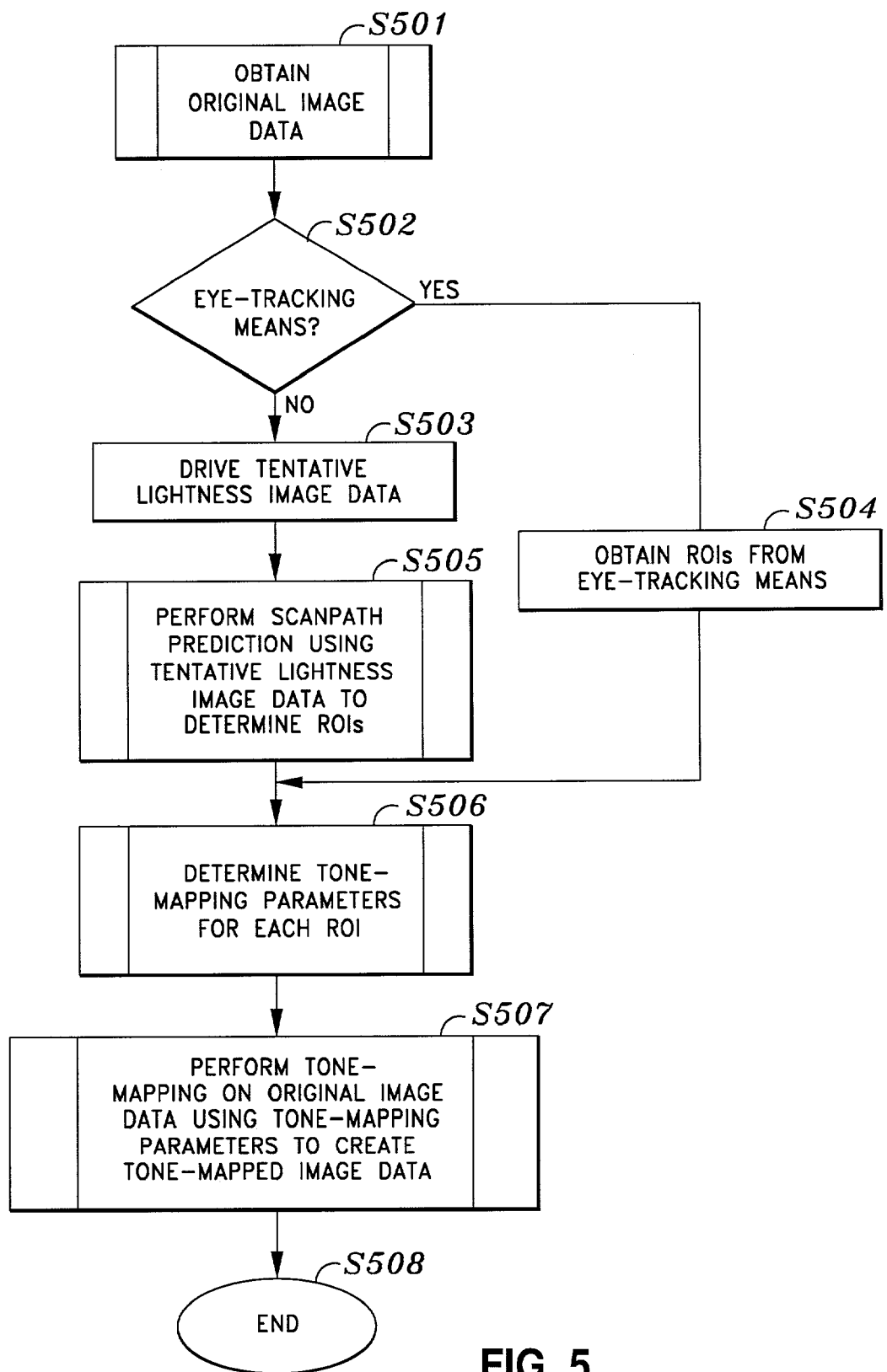
FIG. 5 is a detailed flow diagram explaining the operation of one embodiment of the invention.

FIG. 5 is a detailed flow diagram explaining the operation of the invention according to one embodiment of the invention. First, original image data 80, is obtained in step S501. Some of the possible sources of image data are discussed below with respect to FIG. 6. Step S502 makes a determination as to presence of eye-tracking means 81 that, as described above, employ hardware to track a viewer's eye fixations and measure the scanpath of the viewer while viewing the image. Such hardware can be installed, for example, in the viewing lens 21 of image capture device 20. The eye-tracking means 81 then measures the scanpath of the photographer who is taking the photograph and determines information regarding regions of interest 82 in the captured image.

If it is determined in step S502 that eye-tracking means 81 are present, there is no need to predict the scanpath and ROIs corresponding to original image data 80, since the measured scanpath and ROIs are available. In that case, as shown in step S504, regions of interest pertaining to original image data are obtained from the eye-tracking means. If it is determined in step S502 that eye-tracking means 81 are not present, then resort is made to scanpath prediction 86 in order to predict the scanpath and ROIs 87 of the image data.

In step S503, tentative lightness image data 85 is derived from original image data. Tentative lightness image data 85 results from conversion of the original RGB image data to image data that is within the human perceptible range. As discussed above, this step could involve use of the default NTSC weighting of original image data 80, for example. The result is a crude, grayscale approximation of what the final, tone-mapped image, would look like. In step S505, some selected set of scanpath predictor algorithm modules 46 are applied to tentative lightness image data of step S503 to determine regions of interest 87 corresponding to the original image data 80. This process is described in more detail below with respect to FIG. 7. In step S506, tone-mapping parameters 90 are obtained for each of the regions of interest 87 determined by step S505. The determination of tone-mapping parameters 90 is described in more detail below with respect to FIG. 8. In step S507, tone-mapping is performed on original image data 80 in regions of interest 87 according to the tone-mapping parameters 90 from step S506, resulting in tone-mapped image data 92. This tone-mapping process is discussed in more detail below with reference to FIG. 9.

As a result of the process described in FIG. 5, tone-mapping on an original image data is performed according to what a viewer of an image would find interesting or important in the image, resulting in an image with optimal tonal values for improved aesthetic appearance to a viewer. This is in contrast to the conventional approach where tone mapping is performed on an entire image, without regard to what a viewer of the image would fine interesting or important. By way of an example, a dark area in an image may contain a human face or an underside of a table. If the dark area corresponds to a human face, the above technique would ensure that its tonal value is mapped so that it is represented in the final image. However, if the dark area corresponds to the underside of a table, then it may be mapped so that details are not represented at all.

Figure 6:
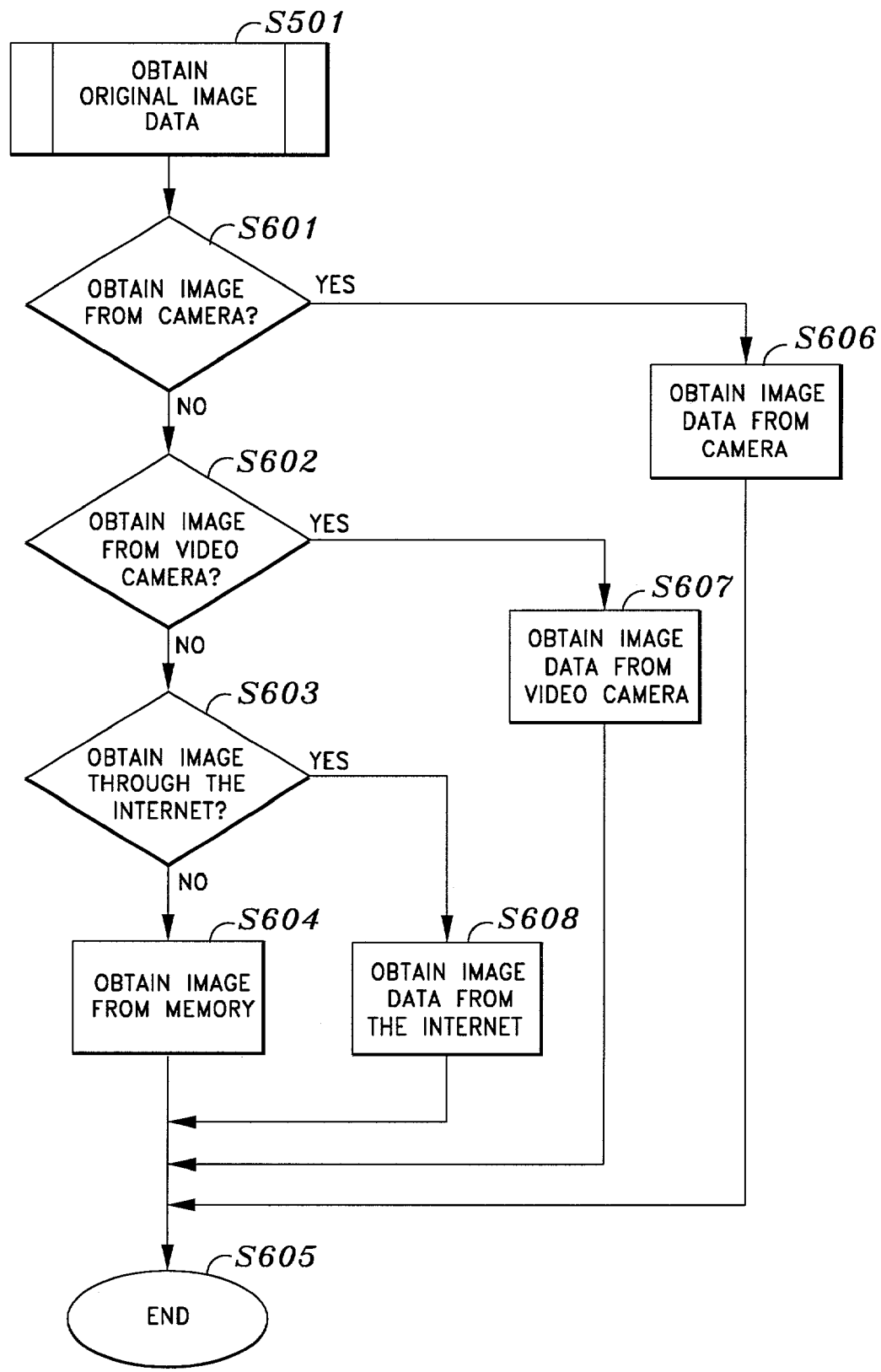
FIG. 6 is a flow diagram for explaining the obtainment of image data in accordance with one embodiment of the invention.

FIG. 6 is a flow diagram further describing the obtainment of original image data 80 in step S501 of FIG. 5. Although FIG. 6 depicts several alternative sources for obtaining original image data, it should be appreciated that the present invention is not dependent on any particular source, and that the invention works equally well image data obtained from other sources. Briefly, original image data 80 may be obtained from a variety of sources including image capture device 20, the Internet via network 1, or from memory, for example. In more detail, a determination is made in step S601 as to whether the original image data 80 is to be obtained from a camera. If it is determined in step S601 that original image data 80 is to be obtained from a camera such as image capture device 20, then original image data 80 is obtained from the camera and the process ends, as shown in steps S606 and S605. If it is determined in step S601 that original image data 80 is not to be obtained from the camera, then the flow moves to step 602 to determine whether the original image data 80 is to be obtained from a video camera. If it is determined in step S602 that original image data 80 is to be obtained from a video camera, then the original image data 80 is obtained from the video camera and the flow process ends, as shown in steps S607 and S605. If it is determined in step S602 that original image data 80 is not to be obtained from a video camera, then the flow moves to step S603, which determines whether the original image data 80 is to be obtained from the Internet. If it is determined in step S603 that original image data 80 is to be obtained from the Internet, then the original image data 80 is obtained from the Internet and the flow process ends, as shown in steps S608 and S605. If it is determined in step S603 that the original image data 80 is not to be obtained from the Internet, then the original image data 80 is obtained from a memory source such as fixed disk 17 in computing equipment 10, and the flow ends, as shown in steps S604 and S605.

Figure 7:
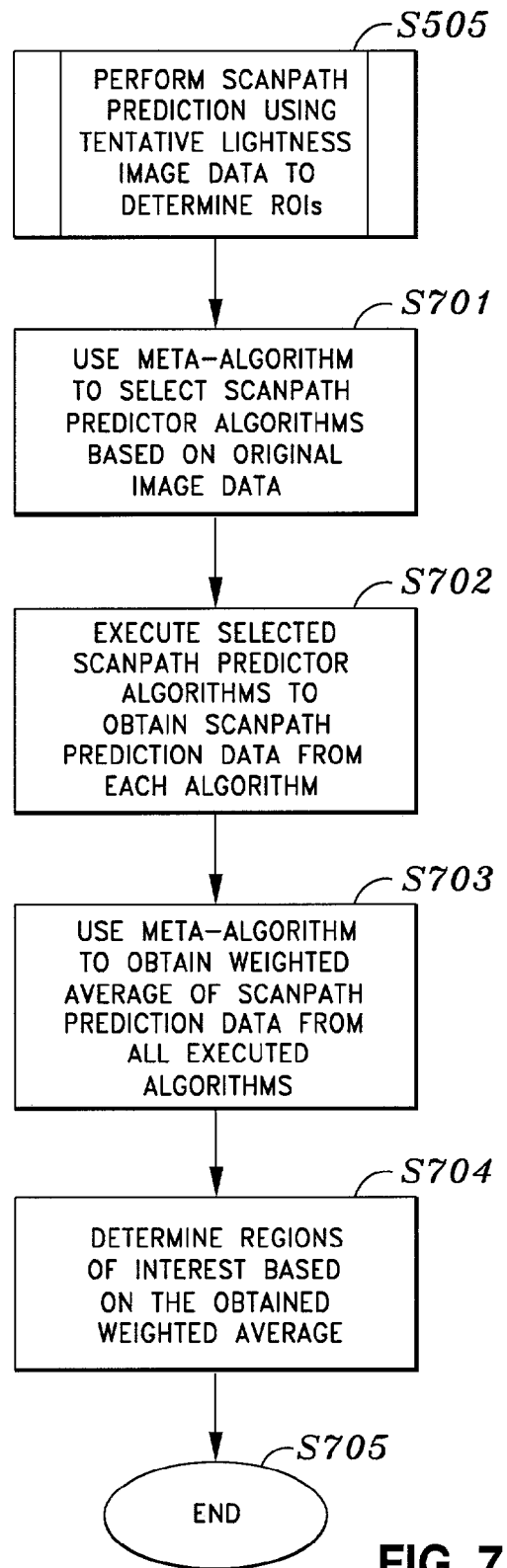
FIG. 7 is a flow diagram showing steps for performing scanpath prediction in accordance with one embodiment of the invention.

FIG. 7 is a flow diagram for describing the scanpath prediction using tentative lightness image data 85 in step S505 of FIG. 5. As discussed above, according to scanpath theory, when examining an image, people first form a mental model of what they expect to see and then look through the scene for confirmation of their mental impressions. These expectations are further refined as the features in the image are compared against features in the mental model. In practice, the predictive model of the scanpath theory is trained much the same way as a neural network to predict a scanpath of an image.

Different algorithms have been developed for predicting scanpath of an image. Theses algorithms are based on various characteristics of an image. For example, a scanpath predictor algorithm may look for edges present in the image. Such edges may be detected by being passed through a Sobel edge-detection filter that detects horizontal and vertical changes in an image and computes the magnitude and direction of the edges in the image. Similarly, another scanpath predictor algorithm may focus on the density of edges, or the density of edges with vertical or horizontal orientations. Aside from focusing on edge characteristics, other scanpath predictor algorithms may be concerned with other characteristics of an image such as luminance or contrast shifts that occur in an image, for example. As mentioned above, each of scanpath predictor algorithm modules 46 represents a different type of scanpath predictor algorithm.

Returning to FIG. 7, in step S701 a meta-algorithm is employed to select one or more scanpath predictor algorithms which would be most suitable, and thus provide the most accurate scanpath prediction, based on the nature of original image data 80. A meta-algorithm is an algorithm that works in conjunction with other algorithms for the purpose of producing optimized results. In the present invention, a meta-algorithm is included in image processing module 54 in order to operate on original image data 80 and to determine which of scanpath predictor algorithm modules 46 would be most suitable for predicting a human scanpath of the image represented by original image data 80. For example, where the image data represents a face which is a region of interest, the meta-algorithm may select one of scanpath predictor algorithm modules 46 which includes face recognition algorithm to determine those regions of image data that represent a face. For outdoor images, one of scanpath predictor algorithm modules 46 that is based on an edge detection algorithm may be most suitable. Where various areas of lightness and darkness are present, a contrast-based one of scanpath predictor algorithm modules 46 may be most suitable for determining the regions of interest.

The scanpath predictor algorithm modules 46 selected in step S701 are executed in step S702 to obtain a set of scanpath prediction data for the original image data 80 from each selected one of scanpath predictor algorithm modules 46. In step S703, the meta-algorithm is used to obtain a weighted average of the sets of scanpath prediction data obtained in step S702. The weight averaging performed in step S703 is based on the likely predictive capability of each selected scanpath predictor algorithm module and can be performed by, for example, assigning a numerical value to each set of scanpath data corresponding to a particular scanpath predictor algorithm module, and then aggregating the results. In one embodiment, the assigned numerical values are based on the characteristics of original image data 80, and are determined by each respective scanpath predictor algorithm module based on its predictive results for original image data 80. For example, in case of an image representing an open field with mountains in the background, an edge detection based scanpath predictor algorithm module may be more suitable than one based on contrast shifts. In such case, the set of scanpath predictor data obtained from the edge detection based scanpath predictor algorithm module is assigned a higher numerical value than the set of scanpath predictor data obtained from the contrast-shift based scanpath predictor algorithm module. On the other hand, for an image representing a dark background with various light sources present, the set of scanpath data obtained from a contrast based scanpath predictor algorithm module may be assigned a higher numerical value than the value assigned to the set of scanpath data obtained from an edge-detection based scanpath predictor algorithm module.

In step S704, regions of interest 87 for the image are determined based on the weighted average of the set(s) of scanpath data obtained in step S703. For example, those areas of original image data 80 that correspond to a significant predicted scanpath, as indicated by the weighted average of scanpath prediction data, are identified as regions of interest. Flow then passes to the end in step S705.

As a result of performing the process shown in FIG. 7, only those areas of an image that a viewer is likely to find interesting or important are detected for tone-mapping purposes, resulting in a final tone-mapped image that is more aesthetically pleasing to a typical viewer than an original image that is tone-mapped without regard to regions of interest. This is in contrast to the conventional approach where tone-mapping is performed on an entire image regardless of what regions of the image a viewer is likely find interesting or important.

Figure 8:
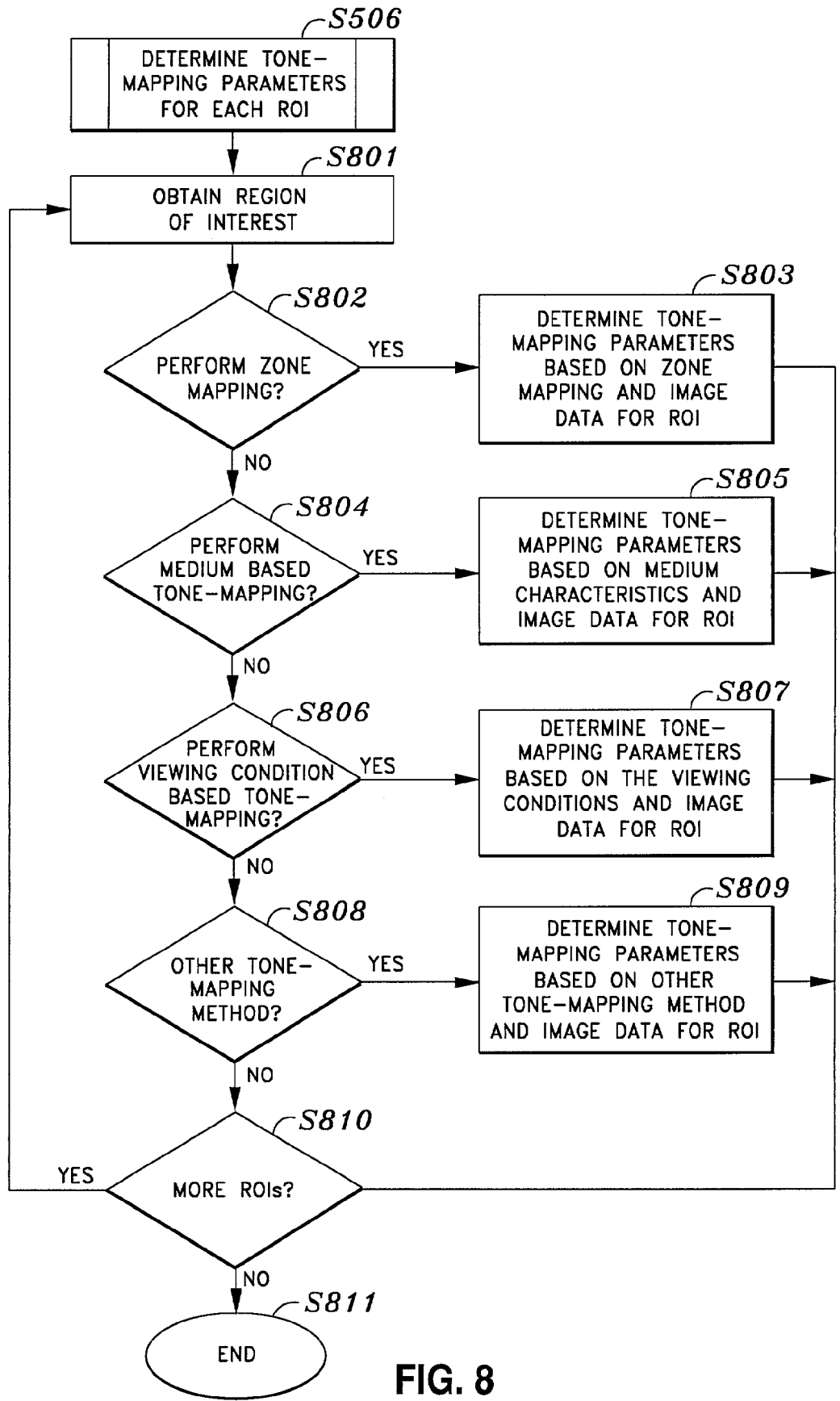
FIG. 8 is a flow diagram showing steps for determining tone-mapping parameters for each region of interest according to one embodiment of the invention.

FIG. 8 is a flow diagram for explaining the determination of tone-mapping parameters for each region of interest in step S506 of FIG. 5. In step S801, a next region of interest pertaining to the original image data 80 is obtained. In step S802, a determination is made as to whether a zone mapping technique is to be applied for determination of tone-mapping parameters for the region of interest obtained in step S801.

As used here, zone mapping refers to a technique, discussed above, developed for use by photographers in taking and developing photographic images. The zone mapping system starts with obtaining measurements of the tone response curves of photographic paper on which the image is to be displayed and divides the tonal range of a photographic print into 11 zones, namely 0 to X. Any part of an image in which texture detail is to be distinguished should generally fall between zones II and VIII. By applying a zone mapping technique, tone-mapping parameters are selected such that when applied to tonal values pertaining to an image, the resulting image has tonal values within zones II to VIII.

If it is determined in step S802 that a zone-mapping technique is to, be employed, then tone-mapping parameters for the region of interest obtained in step S801 are determined based on a zone mapping technique and on the original image data for the obtained region of interest, as shown in step S803. If it is determined in step S802 that a zone mapping technique is not to be employed, then the process moves to step S804 where a determination is made as to whether a medium based tone-mapping technique is to be performed on the obtained region of interest.

Medium based tone-mapping, as used here, refers to the technique whereby mapping is performed with particular reference to a given medium on which the tone-mapped image is to be displayed. For example, as discussed above, the luminance range for CRT displays vary by a factor of 100, whereas print luminance levels only vary by a factor of about 20. Therefore a tone-mapping technique that is suitable for a CRT display may not necessarily be suitable for display of the image on print media. Medium based tone-mapping focuses on this disparity between the luminance levels of different media on which an image is to be displayed and develops mapping parameters for the region of interest obtained in step S801 according to the display medium and image data.

If it is determined in step S804 that medium based tone mapping is to be used, then tone mapping parameters are determined in step S805 based on medium characteristics and on the original image data for the region of interest. If it is determined in step S804 that medium based tone mapping is not being employed, the flow passes on to step S806. In step S806, a determination is made as to whether viewing condition based tone-mapping is being employed. In a viewing condition based tone-mapping technique, the focus is on the viewing environment under which an image is likely to be viewed.

Typical viewing environments for viewing reproductions can be roughly divided into three categories: home, office, and graphic arts. Each of the above categories of viewing environments has a different typical lighting environment. For example, in the U.S. home lighting typically has a chromaticity close to CIE illuminant A, office lighting is typically tri-band fluorescent and has a color temperature between 3500K and 4100K and graphic arts use is specified to be under CIE illuminant D50. In other countries, other illuminants are more typical. In Europe, for example, graphic artists use D65 instead of D50 for viewing booths. A viewing condition based tone-mapping technique aims to optimize tonal appearance of an image based on the likely viewing environment of the tone-mapped image.

Returning to step S806 of FIG. 8, a determination in step S806 that viewing condition based tone-mapping is being employed results in application of a viewing condition based tone-mapping technique for determination of tone-mapping parameters based on likely viewing conditions of the tone-mapped image and original image data for the obtained ROI (step S807).

If it is determined in step S806 that viewing condition based tone-mapping is not being utilized, then the flow moves the process to step S808 in which a determination is made as to whether some other known tone-mapping technique is to be used for the obtained region of interest. Such technique can be, for example, linear mapping, whereby original tonal values are mapped linearly into a narrower range of tonal values. If it is determined in step S808 that some other known tone mapping technique is used to obtain tone mapping parameters, then the flow moves to step S809, where tone-mapping parameters are determined based on the other known tone-mapping technique and on the original image data for the obtained region of interest.

A determination in step S808 that some other known tone mapping method is not being used, or after the determination of tone-mapping parameters in any of steps S803, S805, S807 and S809, the flow proceeds to step S810, where a determination is made as to whether more identified regions of interest remain to be processed. A determination in step S810 that more such regions remain, moves the process back to step S801 where a next region of interest is obtained and processed according to the process described above. A determination in step S810 that no more regions of interest remain to be processed moves the process to step S811, where the flow ends.

By employing the process shown in FIG. 8, tone-mapping parameters for each region of interest are obtained. This is in contrast to the conventional methods whereby tone-mapping parameters are obtained for an entire image regardless of areas within the image which a typical viewer is likely to find interesting or important. Accordingly, it can be appreciated that the present invention results in a tone-mapped image that is aesthetically more pleasing to the viewer than those resulting from conventional methods.

Figure 9:
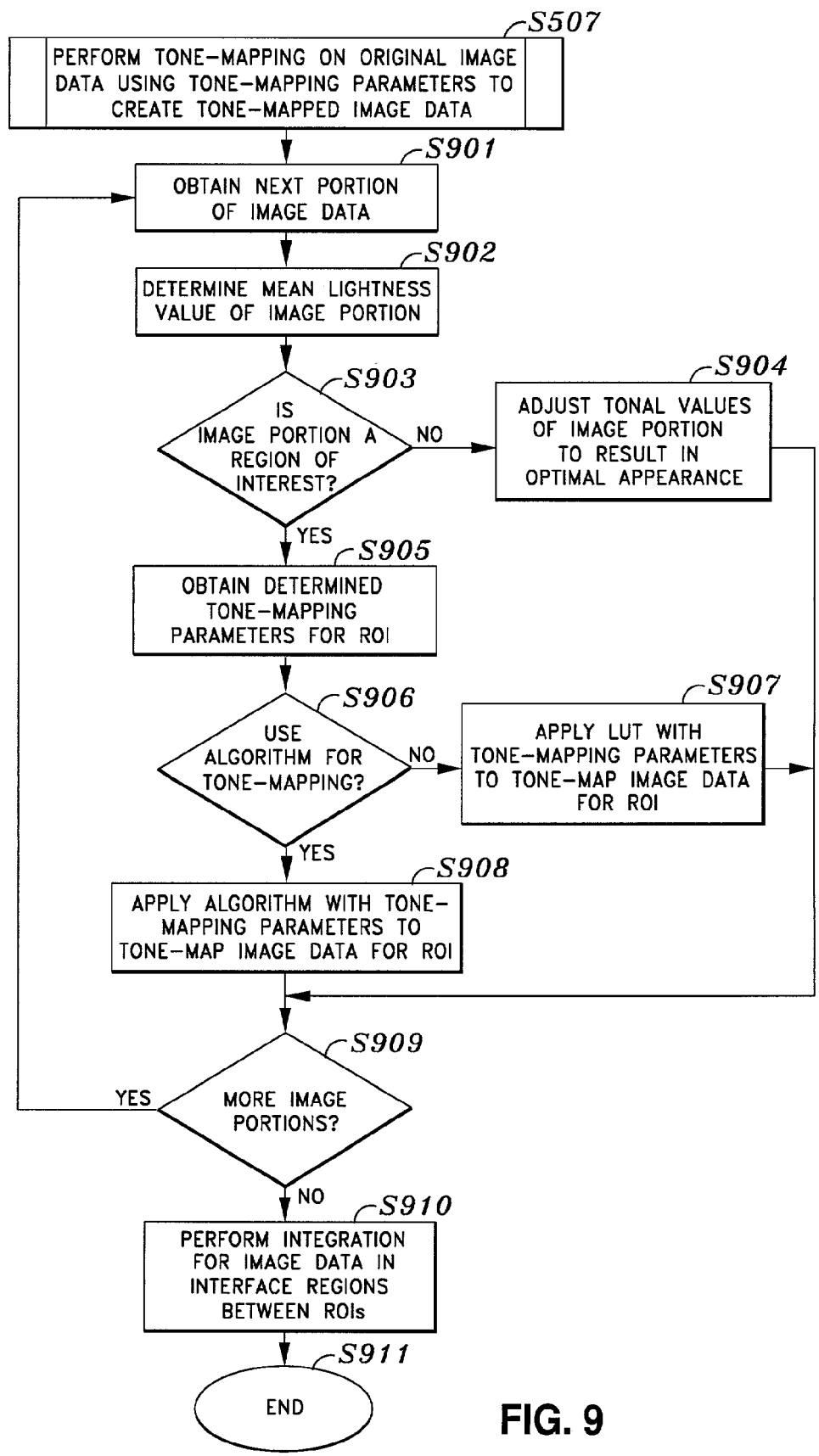
FIG. 9 is a flow diagram showing steps for performing tone-mapping for each region of interest according to one embodiment of the invention.

FIG. 9 is a flow diagram showing steps for explaining the tone-mapping of original image data 80 in step S507 of FIG. 5. Briefly, portions of the original image data are obtained and examined to determine whether they constitute a region of interest. Tonal values of the obtained image portion are then adjusted according to this determination.

In more detail, in step S901 a portion of original image data 80 is obtained. In step 902, a mean lightness value for the obtained image portion is determined. This is used to determine whether the obtained image portion is a distinguishable image portion. For example, in a zone mapping technique, such a distinguishable image portion would correspond to tonal values between zones II and VIII. In step S903 a determination is made as to whether the obtained image portion was previously identified in step S505 of FIG. 5 as a region of interest. If not, flow passes to step S904, in which tonal values of the obtained image portion are adjusted in order to obtain an optimal appearance of the obtained image portion with respect to those other image portions that are identified as regions of interest.

By way of an example, in case of an image taken in a dark room containing a human face and a light source such as a bare light bulb or an open window without a view, the face would likely constitute a region of interest. The light source, however, would not likely be a region of interest. Therefore, although the light source extends the luminance range of the image, there is no reason to maintain the full difference between the light source and the face. In such case the tonal value of the light source can be adjusted so that it is only somewhat lighter than the rest of the image. The tonal values corresponding to the human face could then be adjusted in order to optimize the appearance of the face in the dark room.

If it is determined in step S903 that the image portion obtained in step S901 constitutes a region of interest, the flow moves to step S905 where the determined tone-mapping parameters for the obtained region of interest from step S506 of FIG. 5 are obtained. Tone-mapping parameters obtained in step S905 are applied to the image data for the region of interest in order to create a tone-mapped image through application of a tone-mapping algorithm or by utilizing a look-up table ("LUT"). In this regard, step S906 makes a determination as to whether a tone-mapping algorithm is to be used. If it is determined in step S906 that an algorithm is not to be used, then the process moves to step S907 where a look-up table is used to tone-map the original image data for the obtained region of interest based on the determined tone-mapping parameters. A determination in step S906 that an algorithm is used for performing tone-mapping moves the process to step S908, where a tone-mapping algorithm is applied to tone-map the image data for the obtained region of interest based on the determined tone-mapping parameters.

In step S909, a determination is made as to whether more portions of the original image data 80 remain to be examined. A determination that more portions of the original image data 80 remain moves the process to step S901, which starts the process over by obtaining a next portion of the original image data 80 and executing steps S901 to S908. Once all image portions pertaining to the original image data 80 are examined, flow passes to step S910 in which an integration is performed on the image data in the interface regions between the regions of interest. This is done in order to smooth out the transition areas between tone-mapped regions of interest. This step may be necessary because different regions of interest may have been tone-mapped according to different tone-mapping techniques described above, resulting in presence of abrupt transitions in tonal values in the areas between them. By applying an integration method, the tone values of these interface regions can be smoothed out for optimal appearance of the overall tone-mapped image.

In this manner, the present invention automatically tone-maps original image data corresponding to an image based on each region of interest within the image. Therefore, an improved appearance of the tone-mapped image is provided, in contrast to the conventional tone-mapping techniques in which tone-mapping is applied to an entire image.

The invention has been described with respect to particular illustrative embodiments. It is to be understood that the invention is not limited to the above-described embodiments and that various changes and modifications may be made by those of ordinary skill in the art without departing from the spirit and scope of the invention.

What is claimed is:

1. An image processing method for processing image data, the method comprising the steps of:
   an obtaining step of obtaining scanpath data corresponding to original image data;
   an ROI determining step of determining regions of interest for the original image data based on the obtained scanpath data;
   a parameter determining step of determining tone mapping parameters for each region of interest from said ROI determining step; and
   a mapping step of mapping tone values of the original image data corresponding to each region of interest from said ROI determining step based on corresnonding tone mapping parameters from said parameter determining step in order to obtain tone-mapped image data.

2. The image processing method of claim 1, wherein the scanpath data is obtained by application of a scanpath predictor algorithm to the original image data.

3. The image processing method of claim 2, wherein the scanpath algorithm detects edges in the original image data in order to obtain the scanpath data.

4. The image processing method of claim 3, wherein edges are detected by passing the image through an edge-detection filter.

5. The image processing method of claim 2, wherein the scanpath algorithm detects luminance shifts in the original image data to obtain the scanpath data.

6. The image processing method of claim 2, wherein the scanpath algorithm detects contrast shifts in the original image data to obtain the scanpath data.

7. The image processing method of claim 1, wherein the scanpath data is obtained by aggregation of scanpath data obtained from each of a plurality of scanpath predictor algorithms.

8. The method of claim 7, wherein a meta algorithm is utilized to select the plurality of scanpath predictor algorithms.

9. The image processing method of claim 1, wherein the scanpath data is obtained from an eye-tracking device that tracks eye movements of a viewer of an image corresponding to the original image data.

10. The image processing method of claim 1, wherein the image processing method is implemented in a processor of a digital camera.

11. The image processing method of claim 1, wherein the image processing method is implemented in a computing device.

12. The image processing method of claim 1, wherein there are plural sets of tone-mapping parameters, and wherein each set of tone-mapping parameters is determined by application of a lowpass filter to the original image data so as to reduce the dynamic range of the original image data.

13. The image processing method of claim 1, wherein the tone-mapping parameters are non-linear.

14. The image processing method of claim 1, wherein the tone-mapping parameters are utilized by a tone-mapping algorithm to map the tone values.

15. The image processing method of claim 1, wherein the tone-mapping parameters are utilized by a look up table to map the tone values.

16. The image processing method of claim 1, wherein the tone-mapping parameters are determined based on tone characteristics of an output medium.

17. The image processing method of claim 1, wherein the tone-mapping parameters are based on potential viewing environment characteristics.

18. The image processing method of claim 1, wherein each set of tone-mapping parameters are determined based on tonal zones of the corresponding region of interest.

19. The image processing method of claim 1, wherein the tone values are mapped by applying a tone-mapping scale to all of the original image data.

20. The image processing method of claim 1, wherein the tone values are mapped by applying a tone-mapping scale to each region of interest.

21. The image processing method of claim 1, wherein tentative-lightness image data is derived from the original image data, and the scanpath data is obtained from the tentative-lightness image data.

22. The image processing method of claim 21, wherein the original image data is RGB image data and the tentative-lightness data is based on NTSC-weighting of the RGB image data.

23. The image processing method of claim 7, wherein the aggregation of scanpath data is a weighted-average obtained based on an amount of time spent by a viewer on a location of the original image, corresponding to the original image data.

24. An image processing method for processing image data, the method comprising the steps of:
    filtering original image data corresponding to an image to obtain filtered image data;
    obtaining scanpath data corresponding to the filtered image data by using a meta algorithm which analyzes a plurality of scanpath algorithms, which selects at least two of the scanpath algorithms based on the filtered image data, and which generates a weighted average of scanpath data obtained from each of the selected scanpath algorithms;
    determining a plurality of regions of interest for the original image data based on the obtained scanpath data;
    determining a set of tone-mapping parameters for each of the determined regions of interest; and
    mapping, with a tone-mapping algorithm, the tone values of the original image data for each region of interest based on the corresponding set of tone-mapping parameters in order to obtain tone-mapped image data.

25. A computer readable memory medium on which computer executable process steps are stored, said computer readable process steps for processing image data, the computer executable process steps comprising steps to perform a method according to any one of claims 1 to 11 or 12 to 24.

26. Computer-executable process steps stored on a computer readable medium, said computer-executable process steps for processing image data, the computer-executable process steps comprising process steps executable to perform a method according to any one of claims 1 to 11 or 12 to 24.

27. A computing device for processing image data, the computing device comprising:
    a program memory for storing process steps executable to perform a method according to any one of claims 1 to 11 or 12 to 24; and
    a processor for executing the process steps stored in said program memory.

* * * * *

UNITED STATES PATENT AND TRADEMARK OFFICE
CERTIFICATE OF CORRECTION

PATENT NO. : 7,136,073 B2  Page 1 of 1
APPLICATION NO. : 10/271579
DATED : November 14, 2006
INVENTOR(S) : Todd Newman It is certified that error appears in the above-identified patent and that said Letters Patent is hereby corrected as shown below:

COLUMN 11:
Line 61, "to," should read -- to --.

COLUMN 14:
Line 49, "corresnond-" should read -- correspond --.

Signed and Sealed this

Seventeenth Day of April, 2007

JON W. DUDAS
*Director of the United States Patent and Trademark Office*